Figures 1, 2:
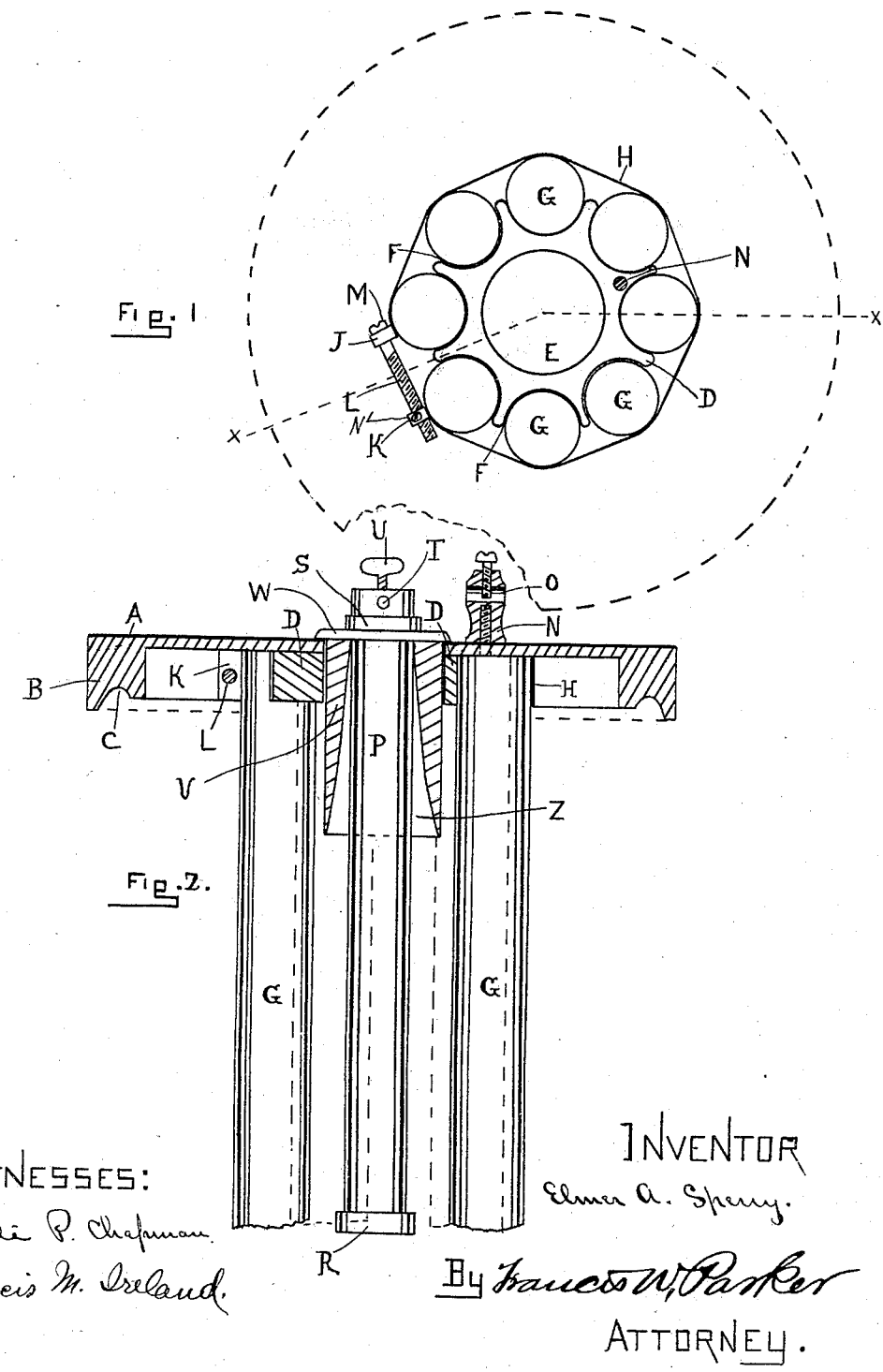

(No Model.)

E. A. SPERRY.
GALVANIC BATTERY.

No. 417,290.  Patented Dec. 17, 1889.

WITNESSES:
Celeste P. Chapman.
Francis M. Ireland.

INVENTOR
Elmer A. Sperry.
By Francis W. Parker
ATTORNEY.

UNITED STATES PATENT OFFICE.

ELMER A. SPERRY, OF CHICAGO, ILLINOIS, ASSIGNOR TO THE ELECTRICAL SUPPLY COMPANY, OF ANSONIA, CONNECTICUT.

GALVANIC BATTERY.

SPECIFICATION forming part of Letters Patent No. 417,290, dated December 17, 1889.

Application filed April 1, 1889. Serial No. 305,583. (No model.)

*To all whom it may concern:*

Be it known that I, ELMER A. SPERRY, a citizen of the United States, residing at Chicago, in the county of Cook and State of Illinois, have invented a new and useful Improvement in Galvanic Batteries, of which the following is a specification.

My invention relates to improvements in galvanic batteries, and has for its object to provide a simple and cheap battery. This object I accomplish by means of the mechanism illustrated in the accompanying drawings, wherein—

Figure 1 is a plan view of my device with cover and zinc removed; and Fig. 2 is a cross-section on the line X X, with the carbons and zinc shown in side view.

Like parts are indicated by the same letter in all the figures.

A is the cover, composed of suitable material, and having the annular flange B, with the grooves C to receive the upper part of the jar.

D is a metal plate having the enlarged central aperture E, and formed with the arc-shaped scallops F F to receive the carbons G G on its outer edge.

H is a metal strap or band passing about the upper ends of the carbons G and adapted to securely fasten them into their respective scallops or receiving-arcs F F. This metal band H terminates at its ends in the lugs J and K, through which passes the screw-bolt L, having the head M.

N is a screw-bolt rising from one of the outer projections of the plate D and adapted to pass through the cover A and receive the binding-post parts O.

P is the zinc rod, having on its lower end the rubber ring R and on its upper end a similar ring S, hole T, and binding-screw U. On the upper part of the zinc and moving therewith is the sheath V, having the cap W, to rest upon the cover A and the inwardly and downwardly enlarged interior aperture Z, through which the zinc passes.

The use and operation of my invention are as follows: By operating the screw-bolt L by means of its screw-head M the ends of the band H may be drawn together and the carbons G be thus securely and tightly fastened against the plate D, forming a tight, small, and compact mass, like that illustrated in Fig. 1. If at any time it should be desirable to remove one of the carbons, it can be done by loosening the screw-bolt L and removing the desired carbon. The zinc may be removed at any time, whether coated or not, through the enlarged opening E in the plate D, by reason of the fact that its supporting-sheath V is so much greater in diameter than the zinc itself. When the carbons so secured are inserted in the top or cover, the screw-bolt N is brought up through an aperture in the cover A and the binding-post O is screwed down, so as to hold the carbons securely to the cover. One wire is then attached to the binding-post, the other to the zinc, and when the electrolyte is introduced the battery is ready for use. The cover, of course, must be of insulating material. The central plate or piece D might be made of any insulating material, in which case the carbons would be connected by the strap H, and the screw-rod N' connected with such strap would then be substituted for the screw-rod N and the binding-post be secured to it.

Having thus fully described my invention, what I claim as new, and desire to secure by Letters Patent, is as follows:

1. In a galvanic battery, the combination of a central plate having arc-shaped scallops about its edge, with a series of elements, each in one of said scallops secured at one end to the plate, the remaining portion of such elements being free.

2. In a galvanic battery, the combination of a central plate having arc-shaped scallops about its edge, with a series of elements secured each at one end in one of said scallops to the plate, a strap encircling said elements about the plate and terminating in lugs, and a screw-bolt passing through said lugs, the remaining portion of such elements being free.

3. In a galvanic battery, the combination of a zinc with a cover, having a large aperture for such zinc and a sheath for such zinc therein and removable therewith.

4. In a galvanic battery, the combination of a zinc with a cover, having a large aperture for such zinc and a supporting-sheath for such zinc therein and removable therewith, said supporting-sheath inwardly and downwardly hollowed out.

5. In a galvanic battery, the combination of a plate attached directly to the jar-cover and provided with scallops about its edge, with elements whose upper ends rest one in each of said scallops and are there secured.

6. In a galvanic battery, the combination of a plate attached directly to the jar-cover and provided with scallops about its edge, with elements whose upper ends rest one in each of said scallops and are there secured by an encircling-strap about the elements and plate.

Signed this 30th day of March, 1889.

ELMER A. SPERRY.

In presence of—
FRANCIS W. PARKER,
CELESTE P. CHAPMAN.